United States Patent
Boyer

Patent Number: 5,299,848
Date of Patent: Apr. 5, 1994

[54] TOOLING COMPRISING TONGS WITH TWO PIVOTED ARMS, WITH A RELEASE SYSTEM

[75] Inventor: Jean-Noël Boyer, Luceau, France

[73] Assignee: ARO S.A., France

[21] Appl. No.: 908,722

[22] Filed: Jul. 6, 1992

Related U.S. Application Data

[63] Continuation of Ser. No. 585,318, Sep. 20, 1990, abandoned.

[30] Foreign Application Priority Data

Sep. 20, 1989 [FR] France ............... 89 12344

[51] Int. Cl.$^5$ .................. B66C 1/28; B25J 15/00
[52] U.S. Cl. .................. 294/106; 294/88; 294/115; 901/38
[58] Field of Search ............ 294/88, 104, 106, 115, 294/116, 118; 901/33, 34, 36–38

[56] References Cited

U.S. PATENT DOCUMENTS

| | | | |
|---|---|---|---|
| 3,153,555 | 10/1964 | Kaplan et al. | 294/88 |
| 3,655,233 | 4/1972 | Twist | 294/118 |
| 4,351,553 | 9/1982 | Rovetta et al. | 901/34 X |
| 4,484,775 | 11/1984 | Norkus | 294/106 X |
| 4,545,722 | 10/1985 | Cutkosky et al. | 901/37 X |
| 4,598,942 | 7/1986 | Shum et al. | 294/106 |
| 4,733,895 | 3/1988 | Hawkes | 294/88 |
| 4,957,320 | 9/1990 | Ulrich | 294/106 |

FOREIGN PATENT DOCUMENTS 0122360 10/1984 European Pat. Off.
0278185 8/1988 European Pat. Off.

*Primary Examiner*—Andres Kashnikow
*Assistant Examiner*—Dean J. Kramer
*Attorney, Agent, or Firm*—Larson and Taylor

[57] ABSTRACT

A tool comprising tongs with two pivoted arms and a release system. The two arms each bear, at their respective ends, pressure members. A drive motor causes the arms to pivot with respect to one another, either to close them and thus permit the pressure members to grip the part to be treated, or to open them and permit the release of the part with respect to the tongs after treatment. This tool in addition includes a release system which insures that the two pressure members are well separated from the part after actuation of the opening of the arms. The release system includes a coupling device adapted to actively control the opening and closing of the arms using a fraction of the power of the drive motor. Preferably, this coupling device is an electrically controlled clutch.

6 Claims, 2 Drawing Sheets

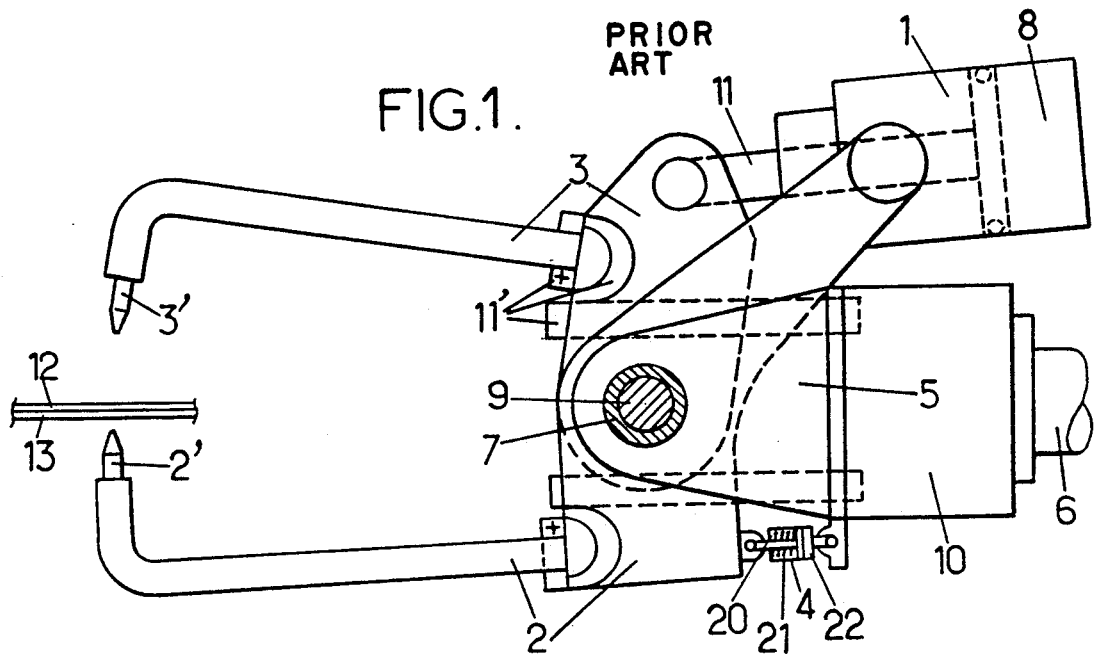
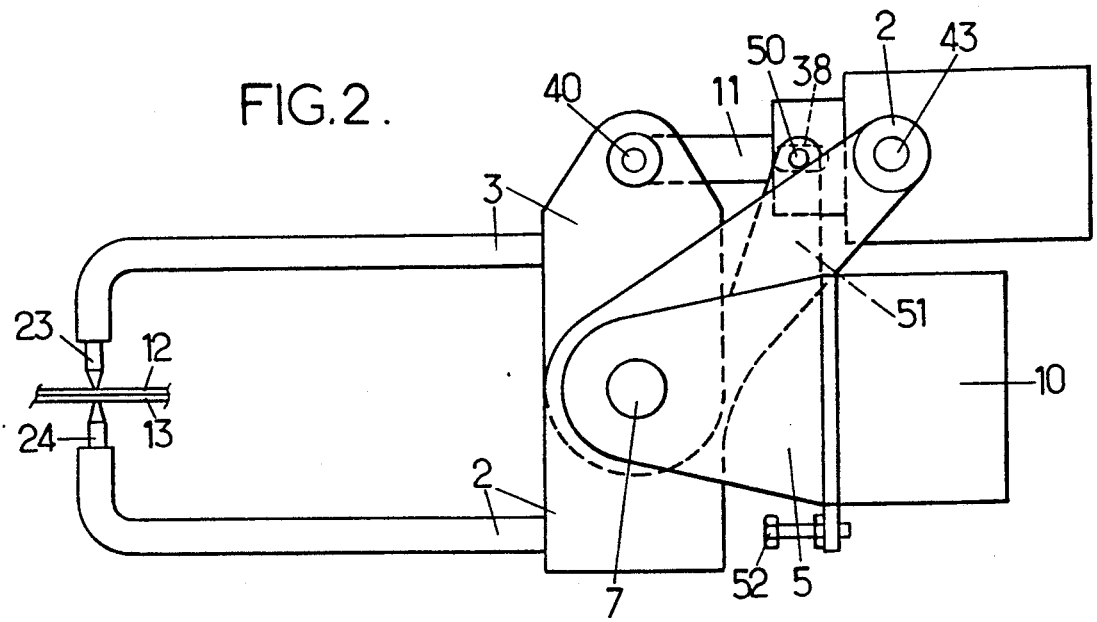

5,299,848

TOOLING COMPRISING TONGS WITH TWO PIVOTED ARMS, WITH A RELEASE SYSTEM

This application is a continuation of U.S. application Ser. No. 07/585,318 filed Sep. 20, 1990 now abandoned.

BACKGROUND OF THE INVENTION

The present invention relates to tooling comprising tongs with two pivoted arms, with a release system, these two arms each bearing, at their respective ends, a pressure member and being associated mutually with drive means adapted to cause them to pivot with respect to one another, either to close them and thus to permit said pressure members to grip parts to be treated, or to open them and permit the disengagement of said parts with respect to the tongs after treatment, this tooling comprising in addition a release system enabling it to be ensured that the two said pressure members are well-separated from said parts after actuation of the opening of the said arms.

The invention also relates generally to tools or machines which have to perform assembly operations by welding, stamping, stapling or the like, or handling, when these tools or machines comprise two arms or jaws designed to grip the parts to be treated or to be manipulated by applying a certain force for the realization of the operation of assembly or of handling concerned. Thus, the expression "pressure members" may denote, for example, resistance welding electrodes, adapted to grip two sheets of metal to weld them together by the passage of a high intensity current, or any tools for stamping, for handling, etc.; and consequently the generic expression "treatment" denotes the corresponding operations of welding, stamping and the like.

The two arms being movable with respect to one another with a degree of freedom permitting them to be automatically adapted, by self-centering, on said parts, it is understood that it does not suffice, in general, to open them to permit the disengagement or the release of the parts once said treatment has been carried out: moreover it is convenient to be assured that the pressure members are both sufficiently separated from said parts, with a well-defined position with respect to the latter. This is the role of the above-mentioned release system.

It is to be noted also, by way of generalities, that this tooling can be mounted on robots or on any other positioning system, the parts being fixed with respect to the ground. In another case, the tooling may be fixed with respect to the ground, the parts then being presented by a robot or a manipulator.

As for the drive means mentioned at the introduction, they can comprise a pneumatic, hydraulic, or hydropneumatic jack, or even a servo-coupled electric motor.

To understand better the present technique as well as the problems that the invention seeks to resolve, there will be described below by way of example, with reference to FIG. 1, a resistance welding tongs with a pneumatic jack, with so-called "X-form" arms, shown in open position and provided with a known release system (the principles and problems which will be mentioned below will be practically the same with similar welding tongs or tooling with so-called "C-form arms").

These tongs are constituted by upper 3 and lower 2 electrode holder arms pivoted to one another around an axle 7. A pneumatic jack 1 is attached on the one hand to the arm 3 through its rod 11 and on the other hand to the arm 2 through its cylinder. The admission of compressed air into the chamber 8 of this jack enables a force to be exerted between the two arms, so-called "welding-force". This force is applied to the metal sheets to be welded 12 and 13 gripped between the two electrodes 3' and 2'. When the welding force is reached, a transformer 10 enables a voltage to be applied between the two electrodes through leads 11' and electrode holder arms 2, 3, themselves serving as conductors. The pivoted whole constituted by the jack 1, the lower 2 and upper arms 3, can itself oscillate around an axle 9 fast to the tongs cradle 5; the tongs cradle is fixed to the end of a robot or of a manipulator arm 6.

For the tongs used for the robots or the manipulators, the relative position of the metal sheets to be welded with respect to the robot or manipulator is not defined with precision. This is due to the wide geometric tolerances of the mechano-welded preassemblies, to wear of the electrodes, and to deviations of the trajectory of the robots.

Due to the floating mounting of the arms 2 and 3 with respect to the pivot 9, they may be self-positioned with respect to the metal sheets during the closing of the jack.

When the tongs are open, the self-centering system described above is not capable of ensuring that one of the two electrodes is no longer in contact with the metal sheets to be welded to permit the movement of the robot. In particular, the torque due to the weight of the pivoted assembly may be such that one or other of the electrodes will remain in contact with the metal sheets. This is the reason why one of the two arms (so-called "release arm") must be positioned precisely with respect to the cradle of the tongs 5. This is achieved by means of the release system.

In FIG. 1 is shown a single acting pneumatic jack release system 4. In this case, the pressure is admitted into the chamber 20 of this jack during the opening of the tongs, which separates the arm 2 from the metal sheet 13 and brings it back into a precise position with respect to the cradle 5. During the closing of the tongs, the two chambers of the jack 4 are opened to the atmosphere, which renders the system self-centering.

A spring 21 can replace the compressed air in the chamber 20 and ensure a permanent release force. In this case, during the closing of the tongs, it is the reaction of the upper arm 3 on the metal sheet 12 which brings back the arm 2 into contact with the metal sheet 13, thus compressing spring 21. The stack of metal sheets will have to support this compressive force, as well as the weight if necessary of the pivoted assembly.

It is to be noted that the jack 4 could also be a double-acting jack. In this case, the chamber 22 will be supplied by compressed air at constant or variable pressure, to assist the return of the arm 2 in contact with the metal sheet 13 during the closing phase.

This release-equilibrating system is common: it has the advantage of causing a positive movement with a definite travel and with a precise force. In addition, in the case of a double acting jack, the equilibration of the weight of the movable assembly is well-ensured.

The drawbacks of the known release systems reside however in the difficulty of regulating the movement of such a small jack, which can sometimes cause a shock on the impact of the lower electrode, impossibility of adjusting the release force and, of course, the need to have compressed air and to provide a system of distribution by electrovalve. On the other hand, the movements of the welding tongs in space is such that the force necessary for the return of the release arm against the metal sheet during the closing phase is not constant, since the weight of the release arm may either accelerate this movement, or retard it, or be neutral.

SUMMARY OF THE INVENTION

It is an object of the present invention therefore to obtain a tooling of the general type defined in the introduction, and of which the release system does not show these drawbacks of pneumatic systems or spring systems.

It is also an object of the invention to obtain a better control of the release movement: a precise release, a limited impact speed and especially the possible servo-coupling of the force exerted, either during the closing of the electrode-metal sheet, or during the separation of the electrode-sheet, when welding is involved, more generally during a closing up or a separation between the pressure members and the parts to be treated when it is a matter of operations other than a welding operation.

Accordingly, tooling of the general type defined at the introduction will, in accordance with the present invention, be essentially characterized in that a coupling means operatively connects the drive means and the arms for positively and directly moving the arms in both directions. In addition, the coupling means uses only a fraction of the power of said drive means; in other words the invention consists of using the same drive system to ensure the functions of gripping of the parts and of release.

Preferably, such tooling will also be characterized in that said coupling device is constituted by a controllable clutch, for example of the electrical control type and adapted to generate the release force, and this clutch can be coupled with drive means constituted by a servo-couple electric motor adapted to generate the force necessitated by said treatment of the parts.

BRIEF DESCRIPTION OF DRAWINGS

A tooling according to the invention, applied to an X-form resistance welding tongs, will now be described by way of example, which is in no way limiting, with reference thereto the Figures of the accompanying drawing in which :

FIG. 1 illustrates a prior art device.
FIG. 2 is a view in elevation of the side of the tongs.

DETAILED DESCRIPTION OF THE INVENTION

Figure 4:
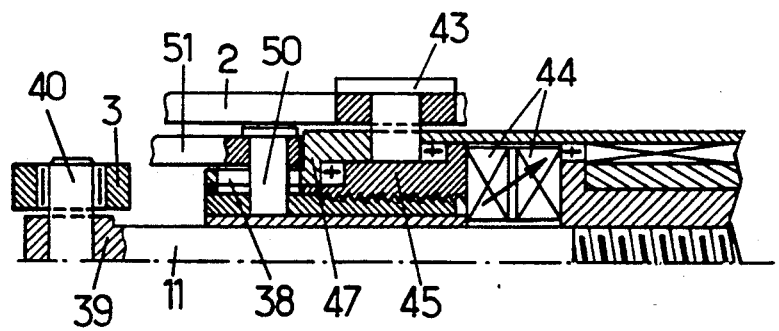
FIG. 4 is a more detailed view, in half axial and horizontal section of the system.

The aforementioned drive means comprise in this application a motor constituted by a rotor 31 on which is fixed a nut 32. The rotor rotates inside a stator 33 itself imprisoned in a rigid cage 34 constituting a housing of the assembly which comprises the drive system and the release system, which cage is pivotable with respect to a lower arm 2 of the welding tongs by means of journals 43 (FIG. 4) which ensure also its immobilization in rotation. The rotor 31 is supported axially and radially by bearings 35 and a ball bearing stop 36; it therefore cannot be moved axially with respect to the cage 34. An axle 11 with a threaded end is screwed into the nut 32; its free end is equipped with a yoke 39 which permits it to be immobilized in rotation with respect to the upper arm 3 of the tongs, due to an axle 40.

The nut 32 may be coupled pneumatically, mechanically, hydraulically or electrically to another nut 45 by means of a clutch constituted by a coupler 44, and this permanently or temporarily.

The coupler 44 must accept slippage in the case of rotary blocking of the nut 45, and the slippage torque may be constant or adjustable, according to the use involved.

The nut 45 is supported axially and radially relative to the cage 34 by ball-bearings 46. Within this nut a hollow screw 47 is engaged, held radially with respect to the cage 34 by an outer bush 48, an inner bush 49 permitting the translation of the rod 11. The screw 47 cannot be moved either in translation, due to journals 50 which connect it to a yoke 51 fixed with respect to the cradle 5 of the tongs (FIG. 2), nor in rotation due to the same journals 50 which pass through an elongated port 38 formed in the cage 34 (see FIG. 4).

Figure 3:
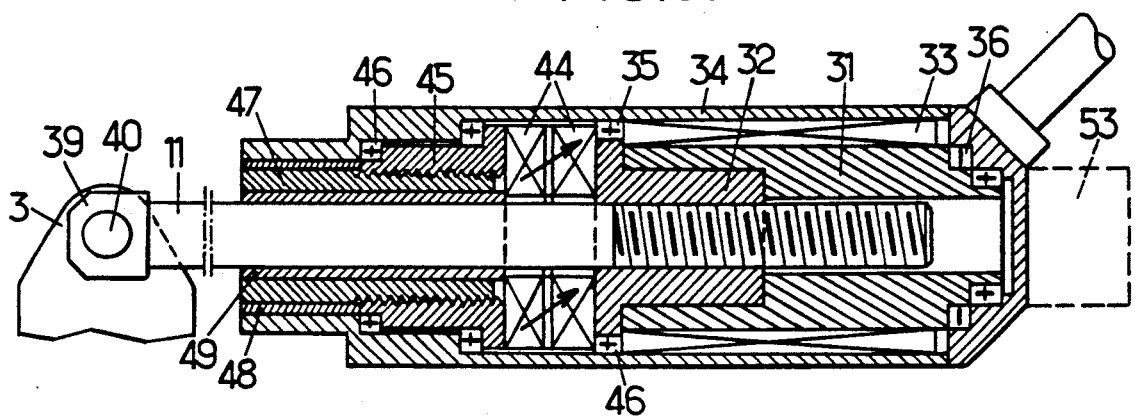
FIG. 3 is a view in axial and vertical section of its release system.

In FIG. 3, the motor is represented in the position of the rod 11 and screw 47 being completely retracted, which corresponds to the open and released tongs.

When the motor rotates in a given direction, the nut 32, blocked in translation, pushes back the rod 11 outwards, which causes the closure of the tongs.

If the clutch or coupler 44 is engaged, the nut 32 rotates the nut 45, in engagement with the hollow screw 47. The nut 45 being unable to move in translation, it tends to cause the longitudinal movement of the screw 47, which cannot rotate on account of the journals 50 in engagement with the cage 34. Now, the screw 47 is also immobilized in translation since it is fast to the cradle 5 of the tongs through journals 50 and the yoke 51. By reaction, it is the motor assembly which recoils, causing the rotation backwards of the yoke 2 around the axle 7, hence the closure of the release arm 2.

When the corresponding pressure member, in this case an electrode 24, arrives in contact with the metal sheet 13, a slippage at the level of the coupler occurs. The rotor 31 as well as the nut 32 continues to rotate until the other pressure member, namely the upper electrode 23, arrives in its turn in contact with the metal sheet 12. At this moment, the motor applies a constant torque which permits the gripping of the metal sheets to be produced between the two electrodes.

For the opening, the motor is actuated in rotation in the other direction, and the nut 32 fast to the rotor 31 causes the translation of the screw 11 towards the inside of the motor. This screw, attached to the movable arm 3 through the yoke 39 of the axle 40, brings back the upper arm 3 to the open position. At the same time, if the coupler 44 is engaged, the nut 45 is rotated and tends to cause the translation inwards of the screw 47. The screw being connected to the yoke 51 through the journals 50 cannot move, and by reaction, it is therefore the motor which moves forwards due to the port 38, causing rotation of the release arm 2 in the direction of opening.

When the release arm arrives at a buffer 52 (FIG. 2), its movement is interrupted, the coupler 44 passes into slippage, and the rotor 31 and the nut 32 continue to rotate until the upper arm 3 arrives at a rear mechanical buffer or at a preprogrammed position if the motor is slaved in position.

It is to be noted that the principle of the invention remains valid if the clutch 44, instead of being electrically actuated, is pneumatically, hydraulically or mechanically actuated. In this case, the release command of the clutch and, possibly, the command of modulating its torque, could also be pneumatic, hydraulic or mechanical.

Another possibility of the invention concerning cases where it uses energy from the principal motor of the welding force to effect the release, consists of replacing the clutch by a permanent coupler. This coupler could be by mechanical friction, hydraulic, magnetic or by Eddy currents, for example, but any other permanent coupling system can be envisaged.

In this case, the operation would be identical with the operation with a controlled clutch, but would not permit either the release at a precise position of the cycle nor the modulation of the force, the essential advantage of this system being its low costs of production and, in certain cases, the permanent braking without dissipation of energy on stopping.

As regards the other systems of release with electrically controlled clutch previously described in the present patent application, it must according to the case concerned be able to assume one or both of the following functions:

self-centering;

blocking of the arm in released position.

The self-centering could be obtained by the reversibility of the screw and nut 45/47 system of the release system.

The blocking of the release arm in open position only causes a problem when the welding force motor is stopped, for example when the tongs are completely open. In this case, either the clutch can supply a permanent static holding torque, or it must rely on the reversibility of the screw-nut system of release.

Similarily, it may be desired, for safety reasons, to avoid a movement of the arms of the tongs when the electric current or the hydraulic or pneumatic energy in the case of a clutch of this type, are interrupted. The solution may be sought again in the irreversibility of the screw-nut system of the release system; or if this irreversibility sets a problem, it must provide for associating with the clutch a static braking system operating even in the absence of energy.

All that which has just been described relates to a release system using the energy of the welding force of the motor, but this applies also to tongs with a pneumatic jack or with an electric motor in which the release is accomplished according to the description of the invention, but with the aid of a special auxiliary release motor.

I claim:

1. A tool comprising:

tongs having two pivoted arms mounted for pivotable movement towards and away from each other, each arm bearing a pressure member at the end thereof, the two arms being pivotally movable between a closed position, whereat the two pressure members grip a workpiece between them and an opened position at which the two pressure members are separated from each other to disengage a workpiece, drive means for causing said arms to pivot with respect to one another about a common pivot axis between said opened and closed position, and a coupling means comprising a direct, non-resilient positive, mechanical connection operatively connecting the drive means and both arms for directly, positively, non-resiliently and mechanically moving both arms both in the closing direction for gripping of the workpiece and in the opening directions to ensure that both of the pressure members and arms are well separated for disengagement from the workpiece, said coupling means comprising a controllable clutch adapted to generate a release force, said controllable clutch being electrically controlled and coupled with a drive means which comprises a slaved electric motor adapted to generate a force required for the treatment of the part.

2. A tool according to claim 1, wherein the clutch has a torque which is capable of being modulated so that the force of approach or the force of withdrawal of each released arm is controlled by electrical signals.

3. A tool according to claim 1, wherein said coupling means comprises a permanent coupler.

4. A tool according to claim 1, comprising an irreversible screw and nut release drive for maintaining said arms in a released position without the addition of energy.

5. A tool according to claim 1, comprising a static brake which is actuated when energy to said coupling means is interrupted, said static brake maintaining said arms in a released position without the addition of energy.

6. A tool comprising:

tongs having two pivoted arms mounted for pivotable movement towards and away from each other, each arm bearing a pressure member at the end thereof, the two arms being pivotally movable between a closed position, whereat the two pressure members grip a workpiece between them and an opened position at which the two pressure members are separated from each other to disengage a workpiece;

drive means for causing said arms to pivot with respect to one another about a common pivot axis between said opened and closed positions, one of said pivoted arms being pivoted around a fixed axle and connected to a cage which incorporates said drive means, the other pivoted arm being connected to a threaded axle of said drive means, this threaded axle being movable only in translation and being screwed in a nut connected to a rotor of that drive means; and including a fixed hollow screw, which screw bears a nut adapted to be connected in rotation to said drive means by the intermediary of a coupling device; and a coupling means comprising a direct, non-resilient positive, mechanical connection operatively connecting the drive means and both arms for directly, positively, non-resiliently and mechanically moving both arms both in the closing direction and for gripping of the workpiece and in the opening direction to ensure that both of the pressure members and arms of well separated for disengagement from the workpiece.

* * * * *